L. L. BENTLEY.
METHOD OF MAKING CORK ARTICLES.
APPLICATION FILED MAY 4, 1911.
1,035,146.
Patented Aug. 13, 1912.
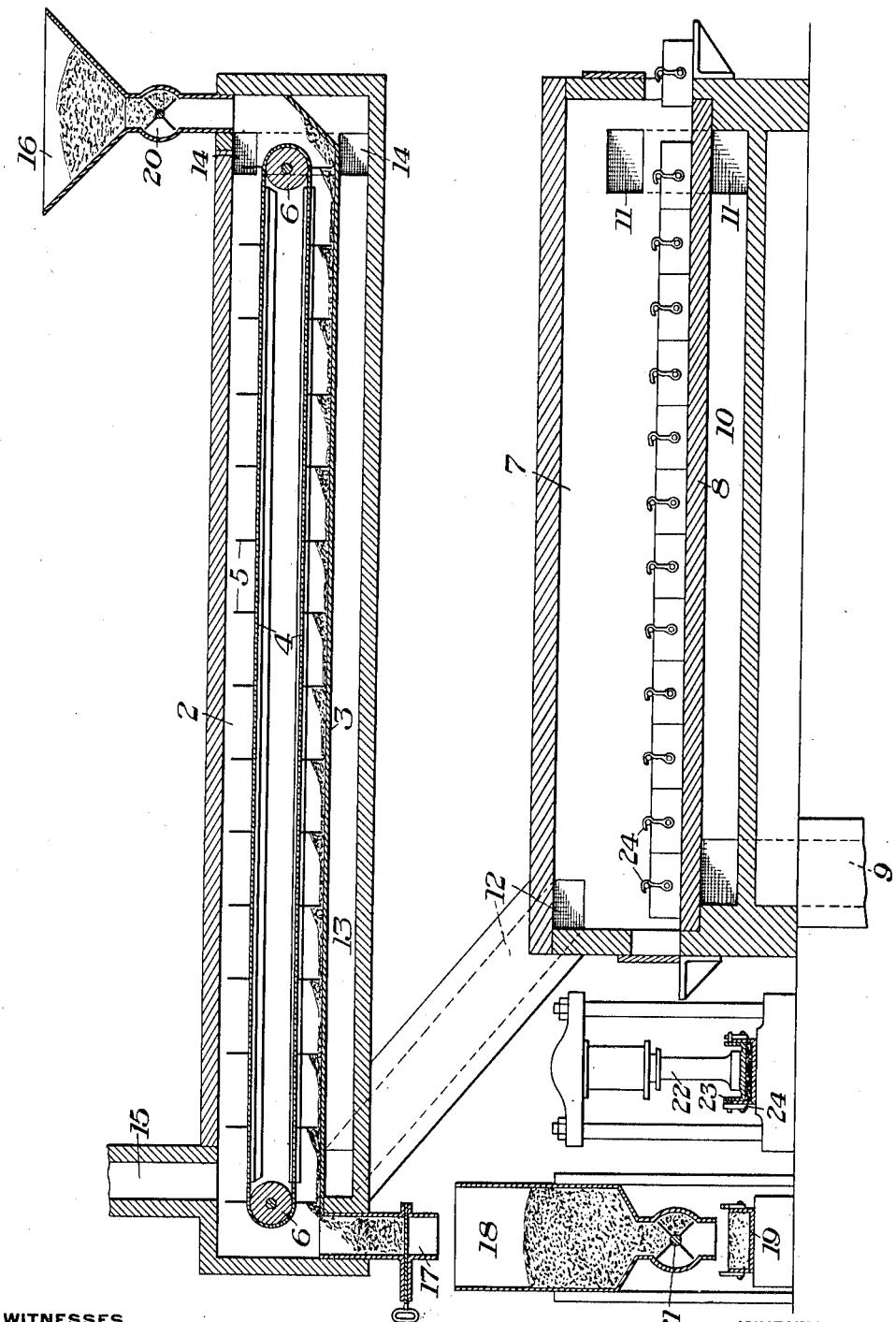

UNITED STATES PATENT OFFICE.

LOUIS L. BENTLEY, OF BEAVER FALLS, PENNSYLVANIA, ASSIGNOR TO ARMSTRONG CORK COMPANY, OF PITTSBURGH, PENNSYLVANIA, A CORPORATION OF PENNSYLVANIA.

METHOD OF MAKING CORK ARTICLES.

1,035,146.  Specification of Letters Patent.  Patented Aug. 13, 1912.

Application filed May 4, 1911. Serial No. 625,118.

*To all whom it may concern:*

Be it known that I, LOUIS L. BENTLEY, a resident of Beaver Falls, in the county of Beaver and State of Pennsylvania, have invented a new and useful Improvement in Methods of Making Cork Articles, of which the following is a full, clear, and exact description.

My invention relates to the manufacture of granulated cork into cork articles, such as insulating material, etc., with the use of the natural resin in the cork as a binding medium.

Heretofore it has been proposed to compress the cork in molds and then bake the cork at a comparatively high temperature sufficient to cause the resinous matter of the cork to cement the cork particles together, after which the mold was removed from the baking oven and the cork article allowed to cool until set, when it was removed from the mold. In the practical use of such process, difficulty has been found in making thick cork boards or blocks, on account of the interior portions of the board not being raised to a sufficient temperature to properly cure and cement the particles together. In such case, the outer portions of the board nearer the mold would be properly formed and cemented, but the interior of the article might be uncured and uncemented. This would cause liability to splitting, absorption of moisture, disintegration, etc., when in use. My invention is designed to overcome this difficulty and also to reduce the cost of production and make a very uniform product.

In carrying out my invention, I preheat the granulated cork before it is fed into the mold, this preheating preferably being carried out by the waste heat from the baking oven. This preheating of the cork drives off the moisture and raises the cork in temperature, so that when fed into the molds, the granular cork will have a certain initial temperature throughout its mass before pressure is applied and the mass submitted to the baking operation.

The accompanying drawing is a longitudinal sectional view through one form of apparatus for carrying out my invention.

In the drawings, the numeral 2 designates a heating chamber having a floor 3.

4 designates an endless conveyer, which is provided with a plurality of blades 5, and is mounted on the drums 6, 6, within the chamber 2. The drums are connected to shafts, which are mounted in suitable bearings and may be driven from any suitable source of power.

7 designates the oven in which the finished articles are baked, and is provided with a floor 8, for receiving the articles, as hereinafter described. This oven is heated by means of hot gases or air, which enters the oven 7, through the flue 9, into the space 10, below the floor, and passes laterally from the end of said space through the port 11 into the oven and from whence it passes by means of a flue 12 to a space 13 below the floor 3 in the heating chamber 2, and passes from the other end of said space to the upper portion of the chamber through the flue 14, from whence the hot air or gases pass outwardly through the stack 15.

16 designates a hopper above the chamber 2, into which the granulated cork to be heated is placed, and 17 designates the outlet for the cork particles, which is immediately above a receptacle 18.

19 is one portion of a mold below the receptacle 18, which has just been filled.

The cork particles are fed from the hopper 16 by means of the rotatable feeding device 20 of the chamber 2, which particles are carried forward by means of the blades 5, to the outlet 17, through which they are dropped into the receptacle 18. The cork particles while passing through the chamber 2 are heated to the predetermined temperature. The heated cork particles are fed from the receptacle 18 to the mold 19 by means of a feeding device 21. The mold 19 is then placed under a press 22 and the top member 23 of the mold is then placed in position. The plunger of the press is then actuated to compress the cork particles between the members 23 and 19, and the member 23 is then locked in position by means of hooks 24 on the sides of the member 19, which hooks engage projections on the sides of the member 23. The mold with the contained article is then placed in the oven 7, and left therein for a predetermined time, in order to heat it up to the required temperature to cement the particles of cork to each other. The mold is then removed from the baking oven and allowed to cool until the cork is set when the article is removed from the mold.

The advantages of my invention result from the preheating of the cork. Cork wood, chips or cuttings from cork from different localities vary largely in the amount of contained moisture, and this preheating drives off the moisture, so that the granulated cork is fed into the molds in more uniform condition as to moisture content. The driving off of the moisture also enables the baking to be better effected on account of better penetration of the heat through the mass, and a saving on baking is effected on account of the cork being hot when it enters the mold. The heat to which the granular cork is raised in preheating is insufficient to cause the resinous matter contained to gum or cement it together, since this step is desired after the pressure is applied to the mold. In practice, I prefer to preheat the cork to a temperature of between 150° to 400° F. One great advantage of my process is that it enables cork articles of almost any thickness to be formed by the baking method, where heretofore the practical limit was about three inches, except where kept in the oven for an excessive length of time. The articles produced are more uniform, better cemented through their interior portions, and a considerable saving in cost of manufacture is obtained.

Various forms of apparatus may be obtained for carrying out my invention. For example, the cork may be preheated by other means than the waste heat from the oven.

I claim:

1. The method of making cork articles, consisting in preheating granulated cork to a temperature below the melting point of the cork resin, feeding this cork while hot into molds, then applying pressure to the cork within the mold, and then baking the cork while under pressure at a temperature high enough to melt the resinous matter to cement the cork granules to each other; substantially as described.

2. The method of making cork articles, consisting in preheating granulated cork to a temperature below the melting point of the cork resin, feeding the cork while hot into molds, then applying pressure to the cork within the molds, and then baking the cork while under pressure at a temperature high enough to melt the resinous matter therein to cement the cork granules to each other and retaining the pressure while allowing it to cool until it is set; substantially as described.

In testimony whereof, I have hereunto set my hand.

LOUIS L. BENTLEY.

Witnesses:
C. P. SYMES,
H. M. CORWIN.